(12) United States Patent
Kumar

(10) Patent No.: US 7,550,030 B2
(45) Date of Patent: Jun. 23, 2009

(54) PROCESS AND APPARATUS TO RECOVER HIGH PURITY CARBON DIOXIDE

(75) Inventor: Ravi Kumar, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 428 days.

(21) Appl. No.: 11/395,138

(22) Filed: Apr. 3, 2006

(65) Prior Publication Data

US 2007/0227352 A1    Oct. 4, 2007

(51) Int. Cl.
*B01D 53/047* (2006.01)

(52) U.S. Cl. .............................. 95/96; 95/101; 95/103; 95/139

(58) Field of Classification Search ............ 95/95, 95/96, 100–103, 117, 139, 148
See application file for complete search history.

(56) References Cited

U.S. PATENT DOCUMENTS

| | | | | |
|---|---|---|---|---|
| 4,171,206 A | * | 10/1979 | Sircar | ............. 95/101 |
| 4,299,596 A | | 11/1981 | Benkmann | |
| 4,770,676 A | | 9/1988 | Sircar et al. | |
| 4,846,851 A | * | 7/1989 | Guro et al. | ............. 95/100 |
| 4,869,894 A | | 9/1989 | Wang et al. | |
| 4,913,709 A | | 4/1990 | Kumar | |
| 4,914,218 A | * | 4/1990 | Kumar et al. | ............. 95/100 |
| 4,915,711 A | | 4/1990 | Kumar | |
| 5,051,115 A | | 9/1991 | Leitgeb et al. | |
| 5,792,239 A | * | 8/1998 | Reinhold et al. | ............. 95/101 |
| 6,245,127 B1 | | 6/2001 | Kane et al. | |
| 6,340,382 B1 | * | 1/2002 | Baksh et al. | ............. 95/96 |

FOREIGN PATENT DOCUMENTS

| | | |
|---|---|---|
| CN | 1347747 | 5/2002 |
| EP | 0 232 840 A2 | 8/1987 |
| EP | 0 311 932 A1 | 4/1989 |

* cited by examiner

*Primary Examiner*—Frank M Lawrence
(74) *Attorney, Agent, or Firm*—Salvatore P. Pace

(57) ABSTRACT

The present invention generally relates to vacuum pressure swing adsorption (VPSA) processes and apparatus to recover carbon dioxide having a purity of approximately $\geq 90$ mole % from streams containing at least carbon dioxide and hydrogen (e.g., syngas). The feed to the $CO_2$ VPSA unit can be at super ambient pressure. The $CO_2$ VPSA unit produces three streams, a $H_2$-enriched stream, a $H_2$-depleted stream and a $CO_2$ product stream. When the $CO_2$ VPSA unit is installed between an SMR/shift reactor and a $H_2$ PSA unit, hydrogen recovery is expected to be increased by extracting $CO_2$, thereby increasing hydrogen partial pressure in the $H_2$ PSA feed. The recovered $CO_2$ can be further upgraded, sequestered or used in applications such as enhanced oil recovery (EOR).

56 Claims, 8 Drawing Sheets

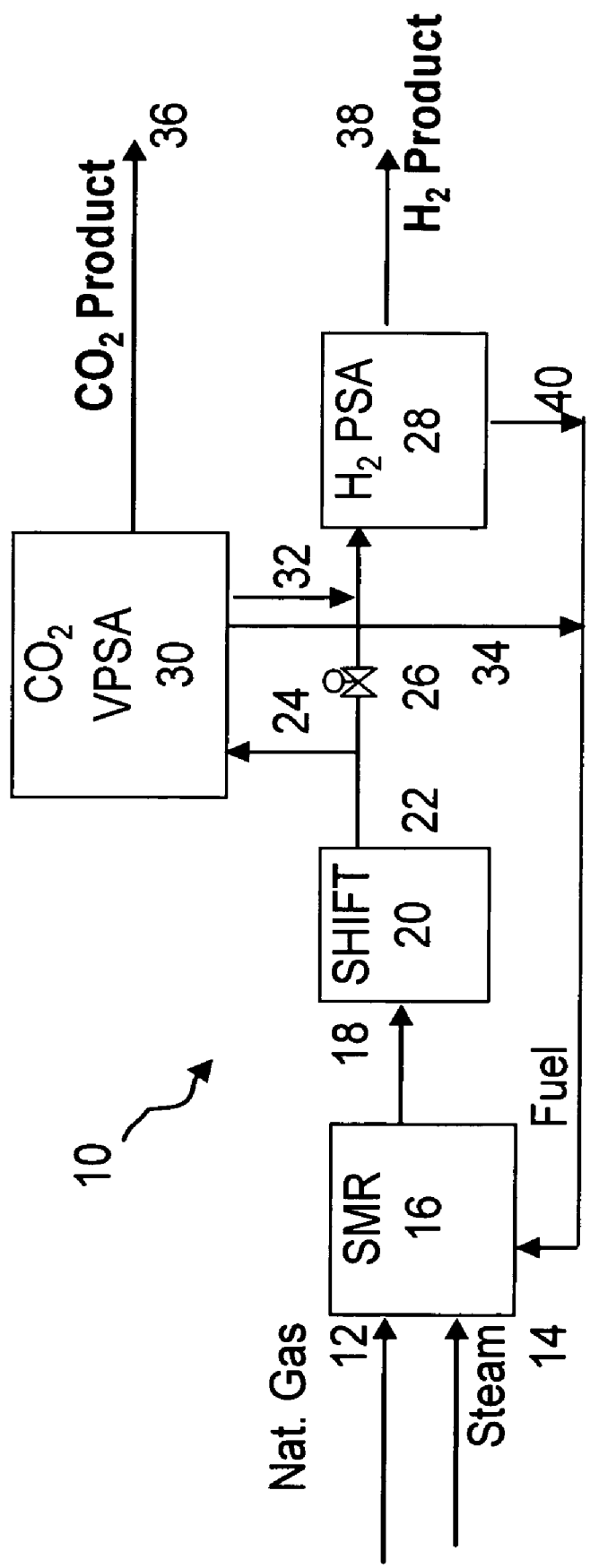

Figure 2

CO₂ VPSA - 5 Beds, 2 Pressure Equalizations

| Bed | | | | | | | | | | |
|---|---|---|---|---|---|---|---|---|---|---|
| A1 | FEED | DP1 | DP2 | Fuel | BD | Evacuation | PE2 | PE1 | FeRP |
| A2 | FeRP | FEED | | DP1 | DP2 | Fuel | BD | Evacuation | PE2 | PE1 |
| A3 | PE2 | PE1 | FeRP | FEED | | DP1 | DP2 | Fuel | BD | Evacuation |
| A4 | Evacuation | | PE2 | PE1 | FeRP | FEED | | DP1 | DP2 | Fuel | BD |
| A5 | DP1 | DP2 | Fuel | BD | Evacuation | PE2 | PE1 | FeRP | FEED | |

Feed to CO₂ VPSA ---> Product as feed to H₂ PSA
CoC DP1 to PE1 with an A bed
CoC DP2 to PE2 with another of the A bed
CoC DP to H₂ PSA Fuel Tank and increase CO₂ concentration in the bed
CcC DP to collect pure CO₂ product from bottom
CcC Evac to collect CO₂ product in the same surge tank as in the CcC DP step.
CCC PE2 with an A Bed on DP2 to increase H₂/CO₂ recovery
CCC PE1 with an A bed on DP1 to increase H₂/CO₂ recovery
CcC RP by Feed Effluent Legend:
| Feed |
| DP1 |
| DP2 |
| Fuel |
| BD |
| Evac. |
| PE2 |
| PE1 |
| FeRP |

CO₂ VPSA - 5 Beds, 2 Pressure Equalizations

Figure 4
Valve Sequence
CO$_2$ VPSA - 5 Beds, 2 Pressure Equalizations

| Step # | Time, sec From | To | Duration | BED A1 | BED A2 | BED A3 | BED A4 | BED A5 |
|---|---|---|---|---|---|---|---|---|
| 1 | 0 | 30 | 30 | Feed | PE1 | Evac. | Fuel | DP1 |
| 2 | 30 | 60 | 30 | Feed | PE1 | Evac. | BD | DP1 |
| 3 | 60 | 90 | 30 | Feed | FeRP | PE2 | Evac. | DP2 |
| 4 | 90 | 120 | 30 | Feed | FeRP | PE2 | Evac. | DP2 |
| 5 | 120 | 150 | 30 | DP1 | Feed | PE1 | Evac. | Fuel |
| 6 | 150 | 180 | 30 | DP1 | Feed | PE1 | Evac. | BD |
| 7 | 180 | 210 | 30 | DP2 | Feed | FeRP | PE2 | Evac. |
| 8 | 210 | 240 | 30 | DP2 | Feed | FeRP | PE2 | Evac. |
| 9 | 240 | 270 | 30 | Fuel | DP1 | Feed | PE1 | Evac. |
| 10 | 270 | 300 | 30 | BD | DP1 | Feed | PE1 | Evac. |
| 11 | 300 | 330 | 30 | Evac. | DP2 | Feed | FeRP | PE2 |
| 12 | 330 | 360 | 30 | Evac. | DP2 | Feed | FeRP | PE2 |
| 13 | 360 | 390 | 30 | Evac. | Fuel | DP1 | Feed | PE1 |
| 14 | 390 | 420 | 30 | Evac. | BD | DP1 | Feed | PE1 |
| 15 | 420 | 450 | 30 | PE2 | Evac. | DP2 | Feed | FeRP |
| 16 | 450 | 480 | 30 | PE2 | Evac. | DP2 | Feed | FeRP |
| 17 | 480 | 510 | 30 | PE1 | Evac. | Fuel | DP1 | Feed |
| 18 | 510 | 540 | 30 | PE1 | Evac. | BD | DP1 | Feed |
| 19 | 540 | 570 | 30 | FeRP | PE2 | Evac. | DP2 | Feed |
| 20 | 570 | 600 | 30 | FeRP | PE2 | Evac. | DP2 | Feed |

Feed to CO$_2$ VPSA ⟶ Product as feed to H$_2$ PSA
CoC DP1 to PE1 with an A bed
CoC DP2 to PE2 with another of the A bed
CoC DP to H$_2$ PSA Fuel Tank and increase CO$_2$ concentration in the bed
CcC DP to collect pure CO$_2$ product from bottom
CCC Evac to collect CO$_2$ product in the same surge tank as in DBD step.
CCC PE2 with an A Bed on DP2 to increase H$_2$/CO$_2$ recovery
CCC PE1 with an A bed on DP1 to increase H$_2$/CO$_2$ recovery
CoC Repressurization by Feed or CcC RP by Feed Effluent "Blank" Valve Closed
○ Valve fully open
⊖ Valve with Positioner

| Feed |
| DP1 |
| DP2 |
| Fuel |
| BD |
| Evac. |
| PE2 |
| PE1 |
| RP |

Figure 5

CO₂ VPSA - 8 Beds, 2 Pressure Equalizations
2 Beds on Feed, 3 Beds on Evacuation

| | | | | | | | | | | | |
|---|---|---|---|---|---|---|---|---|---|---|---|
| A1 | PE1 | RP | PE2 | Evc. | Evacuation | | Fuel | BD | DP2 | Fuel | DP1 | FEED |
| A2 | FEED | DP1 | DP2 | Fuel | DP1 | FEED | RP | PE2 | PE1 | Evacuation | |
| A3 | DP1 | FEED | | Fuel | DP1 | FEED | PE2 | PE1 | Evacuation | | BD |
| A4 | DP2 | Fuel | DP1 | FEED | | RP | PE2 | PE1 | Evacuation | | BD | DP2 |
| A5 | BD | DP2 | Fuel | DP1 | FEED | | PE1 | Evacuation | | Fuel | DP2 | Fuel |
| A6 | Evacuation | | BD | DP2 | Fuel | DP1 | FEED | | RP | PE2 | PE1 | Evac |
| A7 | PE1 | Evacuation | | BD | DP2 | Fuel | DP1 | FEED | | RP | PE2 | |
| A8 | PE2 | PE1 | Evacuation | | Fuel | BD | DP2 | Fuel | DP1 | FEED | | FEED |

Feed to CO₂ VPSA ——> Product as feed to H₂ PSA
CoC DP1 to PE1 with an A bed
CoC DP2 to PE2 with another of the A bed
CoC DP to H₂ PSA Fuel Tank and increase CO₂ concentration in the bed
CcC DP to collect pure CO₂ product from bottom
CcC Evac to collect CO₂ product in the same surge tank as in the CcC DP step
CCC PE2 with an A Bed on DP2 to increase H₂/CO₂ recovery
CCC PE1 with an A bed on DP1 to increase H₂/CO₂ recovery
CoC Repressurization by Feed or CcC RP by Feed Effluent

| Feed |
|---|
| DP1 |
| DP2 |
| Fuel |
| BD |
| Evac. |
| PE2 |
| PE1 |
| FRP |

Figure 6

CO$_2$ VPSA - 6 Beds, 3 Pressure Equalizations

| | | | | | | | | | | | |
|---|---|---|---|---|---|---|---|---|---|---|---|
| A1 | FEED | | DP1 | DP2 | DP3 | Fuel | BD | Evacuation | | PE3 | PE1 | FeRP |
| A2 | PE1 | FeRP | FEED | | DP1 | DP2 | Fuel / BD | Evacuation | | PE3 | PE2 |
| A3 | PE3 | PE2 | FeRP | FEED | | DP1 | DP2 | Fuel / BD | Evacuation | |
| A4 | Evacuation | | PE3 | PE1 | FeRP | FEED | | DP3 | DP1 | DP2 |
| A5 | DP3 | Fuel BD | Evacuation | | PE3 | PE1 | FeRP | FEED | | DP1 | DP2 |
| A6 | DP1 | DP2 | Fuel BD | Evacuation | | PE3 | PE1 | FeRP | FEED |

- Feed to CO$_2$ VPSA ----> Product as feed to H$_2$ PSA
- CoC DP1 to PE1 with an A bed
- CoC DP2 to PE2 with another of the A bed
- CoC DP3 to PE3 with another of the A bed
- CoC DP for Fuel
- CcC DP to collect pure CO$_2$ product from bottom
- CcC Evac to collect CO$_2$ product in the same surge tank as in the CcC DP step.
- CCC PE3 with an A Bed on DP3 to increase H$_2$/CO$_2$ recovery
- CCC PE2 with an A Bed on DP2 to increase H$_2$/CO$_2$ recovery
- CCC PE1 with an A bed on DP1 to increase H$_2$/CO$_2$ recovery
- CcC RP by Feed Effluent

| | Typical | | Start | End |
|---|---|---|---|---|
| | | | psia | |
| t,feed = | 2 | min | 375 | 375 |
| t,DP1= | 1 | min | 375 | 282 |
| t,DP2= | 1 | min | 282 | 190 |
| t,DP3= | 1 | min | 190 | 97 |
| t,cccDP= | 0.5 | min | 96.8 | 40 |
| t,cccDP= | 0.5 | min | 40 | 15 |
| tevac = | 2 | min | 40 | 4 |
| t,PE3= | 1 | min | 4 | 97 |
| t,PE2= | 1 | min | 97 | 190 |
| t,PE1= | 1 | min | 190 | 282 |
| t,RP= | 1 | min | 282 | 375 |
| | 12 | min | | |

| |
|---|
| Feed |
| DP1 |
| DP2 |
| DP3 |
| Fuel |
| BD |
| Evac. |
| PE3 |
| PE2 |
| PE1 |
| FeRP |

CO₂ VPSA - 6 Beds, 3 Pressure Equalizations

Figure 8
Valve Sequence
CO₂ VPSA - 6 Beds, 3 Pressure Equalizations

PROCESS AND APPARATUS TO RECOVER HIGH PURITY CARBON DIOXIDE

TECHNICAL FIELD

The present invention generally relates to vacuum pressure swing adsorption (VPSA) processes and apparatus to recover carbon dioxide having a purity of approximately ≧90 mole percent from streams containing at least carbon dioxide and hydrogen (e.g., syngas). The feed to the $CO_2$ VPSA unit can be at super ambient pressure. The $CO_2$ VPSA unit produces three streams, a $H_2$-enriched stream, a $H_2$-depleted stream and a $CO_2$ product stream.

BACKGROUND OF THE INVENTION

Steam methane reforming (SMR) is the primary process to produce hydrogen ($H_2$) in bulk quantities. After catalytic conversion of natural gas, carbon monoxide and hydrogen is produced as follows in equation (1):

$$CH_4 + H_2O \Leftrightarrow CO + 3H_2 \qquad (1)$$

The gas mixture is shifted (by a water-gas shift reaction) to further produce $H_2$ according to equation (2):

$$CO + H_2O \Leftrightarrow CO_2 + H_2 \qquad (2)$$

After the water-gas shift reaction, typical product gas has a pressure of between about 100-500 psia, a temperature of between about 60-150° F., and a composition of 60-80 mole percent $H_2$, 15-25 mole percent $CO_2$, 0.1-5 mole percent CO, 3-7 mole percent $CH_4$, 0-5 mole percent $N_2$ and is saturated with water. This gas mixture can then be fed to a pressure swing adsorption (PSA) unit to produce high purity $H_2$ (e.g., hydrogen at a purity of at least 99%).

In some current $H_2$ production plants, an amine unit is placed between the shift reactor and the $H_2$ PSA unit to extract $CO_2$ from the stream produced by the shift reactor. This process, however, is energy intensive. In addition, amine units can be difficult to operate and are known to have operational problems, such as corrosion, loss of fluid and the like.

U.S. Pat. No. 4,171,206 relates to production of high purity $CO_2$ and high purity $H_2$ at high $CO_2$ recovery from SMR off-gas. This patent discloses two trains of adsorption beds, which are in communication with each other during the feed and re-pressurization steps. Beds in the $CO_2$ train employ a rinse step by high purity $CO_2$ at high pressure. Depressurization and evacuation of the same bed follow this step. Depressurized gas is recompressed and used for high-pressure rinse. The effluent from the high pressure, high purity rinse step is recycled to the feed.

U.S. Pat. No. 4,299,596 relates to the production of two products at high purity by employing two trains of beds, which are integrated during the feed and co-current depressurization steps. The train producing the more strongly adsorbed species is purged by the co-current depressurized gas after it has been recompressed. Part of the co-current depressurized gas may be recycled for re-pressurization. Evacuation and blowdown steps produce part of the more strongly adsorbed species and part of the purge gas.

U.S. Pat. No. 4,770,676 relates to the production of methane and carbon dioxide from landfill gas. It is an integrated thermal (TSA) and pressure swing adsorption (PSA) process. The waste produced from the PSA regenerates the TSA.

U.S. Pat. No. 4,840,647 relates to production of ≧95% carbon dioxide from a feed stream containing 10-30% $CO_2$ at ambient pressure. The process steps are feed, co-current evacuation, countercurrent evacuation to produce product and a repressurization step. Co-current evacuated gas is used for pressure equalizations/repressurization and mixed with the feed.

U.S. Pat. No. 4,857,083 considers production of carbon dioxide from a gas mixture. At the end of the feed step, the discharge end of the feed column is connected with the inlet end of the evacuated bed to reduce the pressure in this bed. $CO_2$ is then produced by evacuation. This is followed by pressure build up steps.

U.S. Pat. No. 4,913,709 relates to the production of two products at high purity. The reference suggests the use of two trains of beds, which are integrated during the feed and re-pressurization steps. The train producing the more strongly adsorbed species is purged by the more strongly adsorbed species obtained during the evacuation step. This purge is at low pressure and is carried out after the bed has been depressurized. Effluent during the purge step is recompressed and recycled as feed.

U.S. Pat. No. 4,915,711 discloses production of two products at high purity using a single train of beds. The bed is purged by the more strongly adsorbed species obtained during the evacuation step. This purge is at low pressure and is carried out after the bed has been depressurized. Effluent during the purge step and depressurization step is recompressed and recycled as feed.

U.S. Pat. No. 5,026,406 discloses the production of two products at high purity by employing a single train of beds. The bed is purged by the more strongly adsorbed species obtained during the evacuation step. This purge is at low pressure and is carried out after the bed has been depressurized. Effluent during the purge step and depressurization step is recompressed and recycled as feed.

U.S. Pat. No. 5,051,115 produces a more strongly adsorbed species from a gas mixture at high purity. A co-current purge step is employed by the high purity strongly adsorbed species. This purge stream and product are obtained during the evacuation step. Effluent from the purge step is recycled for repressurization.

U.S. Pat. No. 6,245,127 discusses production of $CO_2$ from a low-pressure gas mixture at constant purity. It employs simultaneous purge and evacuation steps. The countercurrent purge is carried out by the less strongly adsorbed species.

It would be desirable to provide economically beneficial processes and apparatus for $CO_2$ recovery. It would further be desirable for such processes and apparatus to be more efficient and easier to use relative to the prior art.

SUMMARY OF THE INVENTION

The present invention generally relates to vacuum pressure swing adsorption (VPSA) processes and apparatus to recover carbon dioxide having a purity of approximately ≧90 mole percent from streams containing at least carbon dioxide and hydrogen (e.g., syngas). The feed to the $CO_2$ VPSA unit can be at super ambient pressure. The $CO_2$ VPSA unit produces three streams, a $H_2$-enriched stream, a $H_2$-depleted stream and a $CO_2$ product stream.

$CO_2$ produced in accordance with the present invention may be used for any desired purpose. For example and while not to be construed as limiting, $CO_2$ produced as described herein can be used for liquefaction to produce food-grade quality product(s), supercritical $CO_2$ for enhanced oil recovery or simply $CO_2$ for sequestration to avoid additional green house gases in the atmosphere in order to satisfy regulatory requirements.

When the $CO_2$ VPSA unit is installed between an SMR/shift reactor and a $H_2$ PSA unit, hydrogen recovery is expected to be increased by extracting $CO_2$, thereby increasing hydrogen partial pressure in the $H_2$ PSA feed stream. The recovered $CO_2$ can be further upgraded, sequestered or used in applications such as enhanced oil recovery (EOR).

The present invention utilizes depressurizations of an adsorbent from high pressure to low pressure to increase $CO_2$ concentration in the bed(s). After $CO_2$ concentration is increased, $CO_2$ product is produced by further pressure reduction. This can be accomplished because of the recognition that for some adsorbents, depressurization from high to low pressure increases $CO_2$ concentration in the adsorbent bed(s).

Consequently, the need for rinse, purge and/or recycle steps as used in the prior art can be eliminated. This in turn allows for the elimination of certain pieces of rotating machines (e.g., rinse compressor, purge compressor, recycle compressor) and associated power requirements, thereby providing a process and apparatus which is expected to be simpler to operate and more efficient than prior art systems. The proposed processes do not require steam and thus are expected to reduce the cost of $CO_2$ separation. To increase $CO_2$ recovery and reduce $H_2$ losses, the present invention uses the depressurized gas to build up or increase the pressure in low-pressure beds. The bed depressurization therefore increases $CO_2$ concentration in the product, and by equalizing with other beds in the unit, at the same time, increases $CO_2$ recovery since this gas is not wasted.

In preferred embodiments in which the $CO_2$ VPSA apparatus is installed between a steam methane reformer (SMR)/shift reactor and a $H_2$ PSA unit, the amount of $CO_2$ in the feed stream to the $H_2$ PSA unit is reduced, thereby allowing for increased recovery of $H_2$ from the $H_2$ PSA unit. In other embodiments of the present invention, a feed stream can be provided by a partial oxidation reactor or the like. In any of these embodiments, the feed stream to the $CO_2$ VPSA unit will be a stream containing at least hydrogen and carbon dioxide at high pressure (for example, 100-500 psia). By eliminating the hardware (i.e. rotating machinery) as mentioned hereinabove, and corresponding power requirements, the present invention is expected to more efficiently produce $CO_2$ from synas or other streams containing at least carbon dioxide and hydrogen relative to the prior art.

BRIEF DESCRIPTION OF THE DRAWINGS

For a more complete understanding of the present invention and the advantages thereof, reference should be made to the following Detailed Description taken in conjunction with the accompanying drawings in which:

FIG. 1 illustrates an embodiment in accordance with the present invention in which a $CO_2$ VPSA unit is positioned upstream of a $H_2$ PSA unit;

FIG. 2 illustrates an exemplary cycle step chart for a five bed process with two pressure equalizations in accordance with the invention;

FIG. 4 shows the operation of the valves outlined in the process schematic of FIG. 3 in accordance with the present invention;

FIG. 5 illustrates a cycle chart for an alternative embodiment of the present invention having eight beds with two pressure equalizations;

FIG. 6 illustrates an exemplary cycle step chart for a six bed process with three pressure equalizations in accordance with the present invention;

FIG. 8 shows the operation of the valves outlined in the process schematic of FIG. 7 in accordance with the present invention.

DETAILED DESCRIPTION

Figure 3:
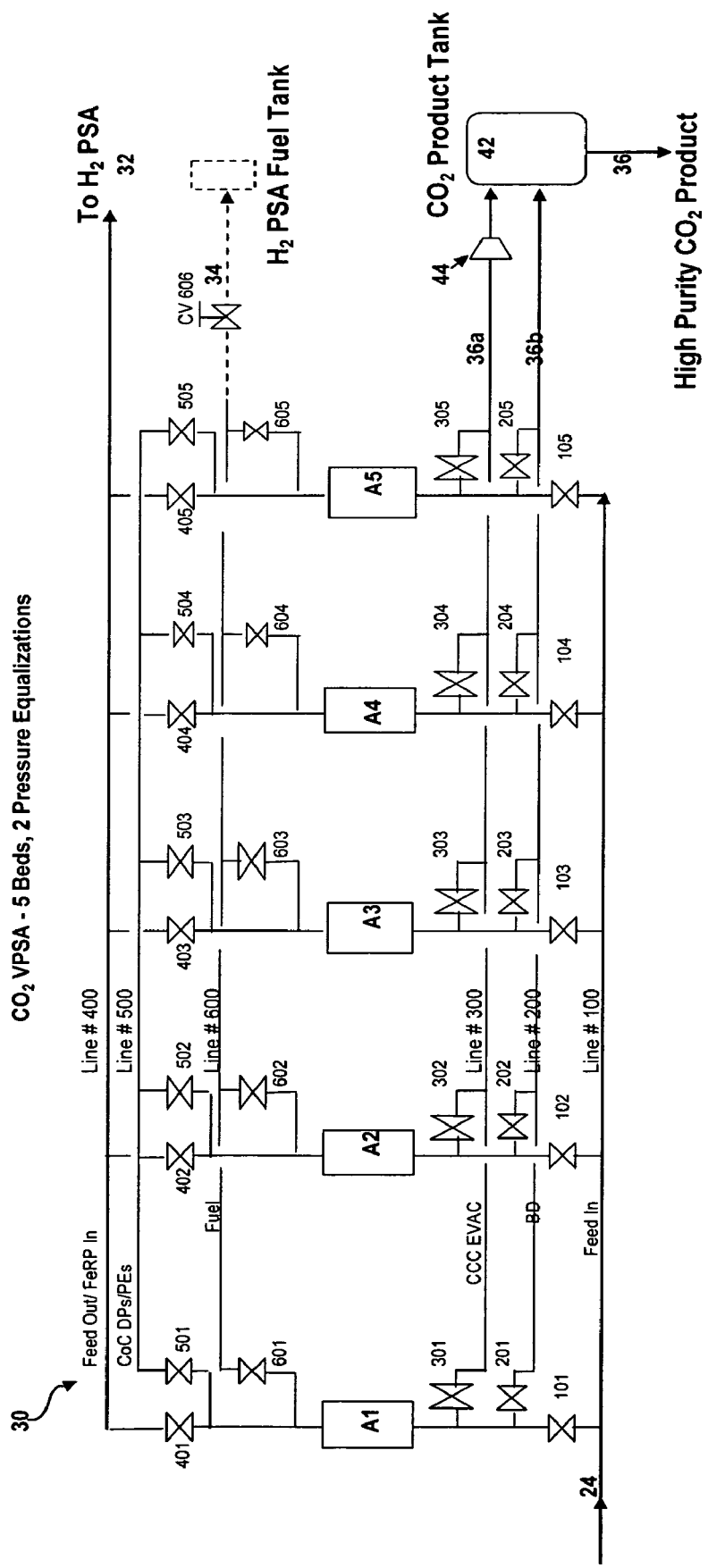
FIG. 3 shows a schematic view of the $CO_2$ VPSA unit for use with the five bed process of FIG. 2 in accordance with the present invention.

As discussed hereinabove, the present invention generally relates to vacuum pressure swing adsorption (VPSA) processes and apparatus to recover carbon dioxide having a purity of approximately $\geq 90$ mole percent from streams containing at least carbon dioxide and hydrogen (e.g., syngas). The feed to the $CO_2$ VPSA can be at super ambient pressure. The $CO_2$ VPSA unit produces three streams, a $H_2$-enriched stream, a $H_2$-depleted stream and a $CO_2$ product stream.

$CO_2$ produced in accordance with the present invention may be used for any desired purpose. For example and while not to be construed as limiting, $CO_2$ produced as described herein can be used for liquefaction to produce food-grade quality product(s), supercritical $CO_2$ for enhanced oil recovery or simply $CO_2$ for sequestration to avoid additional green house gases in the atmosphere in order to satisfy regulatory requirements.

When the $CO_2$ VPSA unit is installed between an SMR/shift reactor and a $H_2$ PSA unit, hydrogen recovery is expected to be increased by extracting $CO_2$, thereby increasing hydrogen partial pressure in the $H_2$ PSA feed stream. The recovered $CO_2$ can be further upgraded, sequestered or used in applications such as enhanced oil recovery (EOR).

As mentioned above, the $CO_2$ VPSA processes and apparatus of the present invention can be used to produce carbon dioxide having a purity of approximately $\geq 90$ mole percent from streams containing at least carbon dioxide and hydrogen (e.g., syngas). The feed to the $CO_2$ VPSA can be at super ambient pressure. The $CO_2$ VPSA unit produces three streams, a $H_2$-enriched stream, a $H_2$-depleted stream and a $CO_2$ product stream. In a preferred embodiment of the present invention and as illustrated in FIG. 1, system 10 includes $CO_2$ VPSA unit 30 positioned upstream of $H_2$ PSA unit 28. As discussed above, natural gas 12 and steam 14 can be reformed in steam methane reformer 16 to produce stream 18, as outlined in equation (1) hereinabove. Stream 18 is then fed to shift reactor 20 to produce stream 22 as outlined in equation (2), as also set forth above. Stream 22 can be fed to $CO_2$ VPSA unit 30 via stream 24. Valve 26 will therefore typically be in the closed position and is in the open position when the $CO_2$ VPSA unit is not being used. Those skilled in the art will appreciate that valve 26 may alternatively be in the partially open position depending on the desired process capacity (i.e., $CO_2$ recovery).

When the arrangement shown in FIG. 1 is used with processes and apparatus in accordance with the present invention, $CO_2$-rich stream 36 (e.g. $\geq 90$ mole %) can be produced, together with hydrogen-rich feed 32 that is expected to result in higher hydrogen recovery 38 from $H_2$ PSA unit 28, and hydrogen-depleted stream 34 (fuel stream) for use in the plant. Hydrogen PSA unit 28 can also produce fuel stream 40 for use in plant 10. The present invention recognizes that depressurizations of a $CO_2$-selective adsorbent layer increases the $CO_2$ concentration in the adsorbent bed(s). More specifically, the present invention recognizes and utilizes depressurizations of an adsorbent from high pressure (e.g., 100-500 psia) to low pressure(s) (i.e., close to ambient and/or subambient pressures) to increase $CO_2$ concentration in the bed.

As used herein, a "feed stream" being fed to a $CO_2$ VPSA unit in accordance with the present invention is a stream containing at least hydrogen and carbon dioxide at a pressure between about 100-500 psia (e.g., 375 psia). After the $CO_2$ concentration is increased by multiple depressurizations, it can be used to produce the $CO_2$ product by further pressure reduction. For some adsorbents, depressurization from high to low pressure increases $CO_2$ concentration in the adsorbent bed. This step in the process can be used to eliminate several process steps as described in the prior art. Consequently, several pieces of rotating machinery (e.g., rinse compressor, purge compressor, recycle compressor) and associated power requirements can be eliminated, thus providing a process and system that enhances operation and improves efficiency. In a first illustrative embodiment of the present invention shown in FIGS. 2-4, the $CO_2$ VPSA unit includes five beds and utilizes nine steps. At any given time during the process, the beds will be in one of the following categories of steps: feed, depressurizations, evacuation, pressure equalizations and repressurization. A variation to the nine-step process shown in FIG. 2 is shown in FIG. 5. In the embodiment shown in FIG. 5, eight beds are used rather than five beds.

Figure 7:
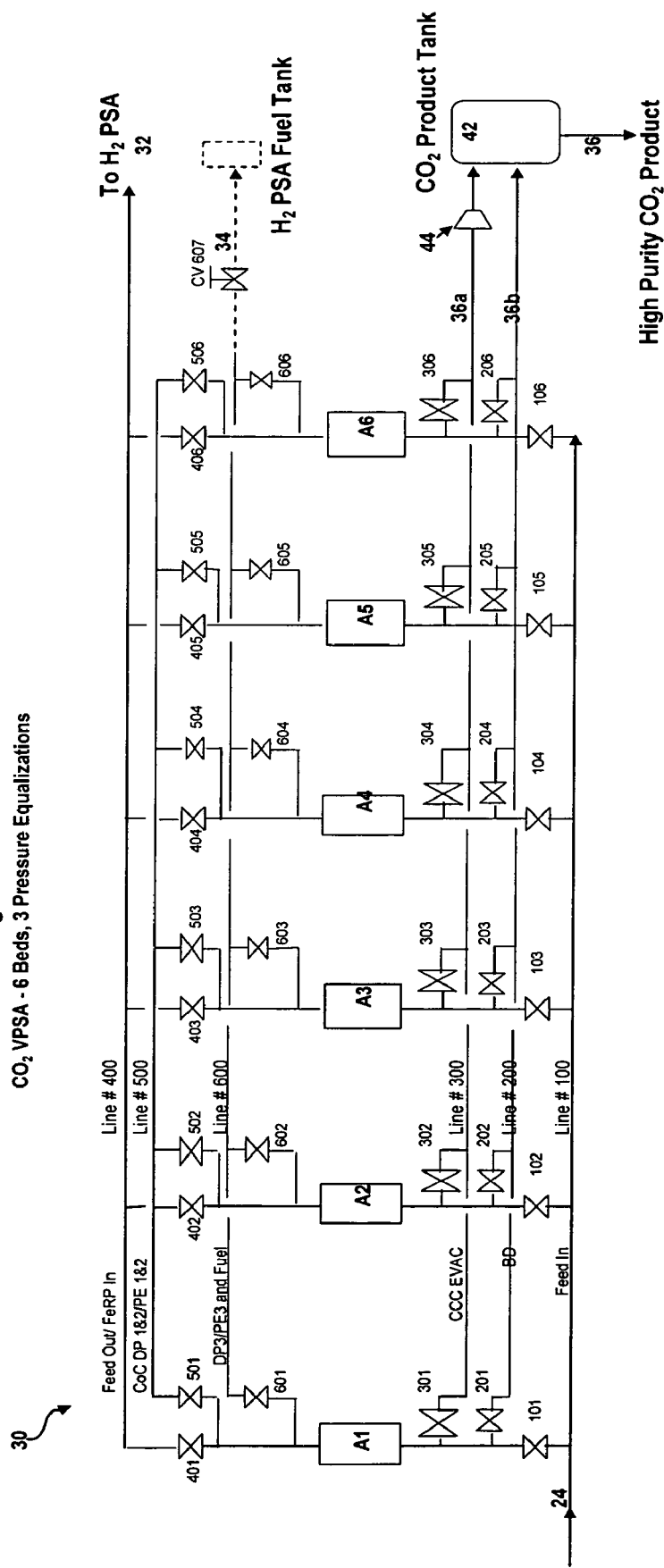
FIG. 7 shows a schematic view of the $CO_2$ VPSA unit for use with the six bed process of FIG. 6 in accordance with the present invention.

In a second and alternative exemplary embodiment of the present invention shown in FIGS. 6-8, the $CO_2$ VPSA unit includes six beds and utilizes eleven steps. At any given time during the process, the beds will be in one of the following categories of steps: feed, depressurizations, evacuation, pressure equalizations and repressurization.

In any of the embodiments, each bed is preferably packed with at least two layers of adsorbents. The type and sizing of the adsorbent layer toward the feed end (i.e., a water-selective adsorbent layer) in the bed is selected to remove moisture in the feed stream such that any residual moisture does not deteriorate the performance of the main (i.e., $CO_2$-selective) adsorbent layer. The water-selective adsorbent layer is also preferably capable of removing impurities (e.g., trace amounts of sulfur or heavy hydrocarbon compounds) from the feed stream, to the extent such impurities are present. The main, second adsorbent layer (i.e., the $CO_2$-selective adsorbent layer) is used for selectively adsorbing $CO_2$ from the feed stream after sufficient moisture has been removed. For the first adsorbent layer (i.e. the water-selective adsorbent layer), adsorbents such as activated alumina, silica gel or zeolite molecular sieve are preferred.

These adsorbents are intended to be illustrative and other adsorbents capable of removing sufficient moisture are also suitable for use in accordance with the present invention. Preferred characteristics for such adsorbent(s) include: high crush strength capabilities, high attrition resistance, large bulk density, low inter-particle void, high heat capacity, large thermal conductivity, low-pressure drop and stable in liquid water.

The main adsorbent layer (i.e., the $CO_2$-selective adsorbent layer) following the water-selective adsorbent layer preferably has the following characteristics: high selectivity, high working capacity, fast kinetics and low heat of adsorption. Typical examples of such adsorbents include, but are not limited to: NaY, HY, NaX, silica gel, and activated carbon. Other desired physical properties of the main layer adsorbents (i.e. the $CO_2$-selective layer) include high crush strength, high attrition resistance, large bulk density, low inter-particle void, high heat capacity, large thermal conductivity and low-pressure drop during the feed and evacuation steps.

Those skilled in the art will appreciate that a composite mixed layer containing both adsorbents could be used in the present invention so long as the characteristics of the adsorbents are satisfied. Referring now to FIGS. 2-4, a $CO_2$ VPSA unit having five-beds (A1-A5) and utilizing nine process steps are shown. This embodiment of the invention employs two pressure equalizations, as shown. These process steps include:

1. Feed Step: A feed stream 24 (shown in FIG. 1) containing at least carbon dioxide and hydrogen gases at a high pressure between about 100-500 psia (for example, about 375 psia) and produced by the shift reactor 20 is diverted to the $CO_2$ VPSA unit of the present invention. High-pressure effluent 32 (i.e., a $H_2$-enriched stream) from the $CO_2$ VPSA unit (unit 30 in FIG. 1) is sent to the $H_2$ PSA unit 28, which in turn produces high-pressure, high purity hydrogen product (stream 38 in FIG. 1). After a predetermined time or after $CO_2$ breakthrough from the bed on the feed 24, the feed step is terminated.

2. Co-Current (CoC) Depressurization 1 (DP1): The $CO_2$ VPSA bed, which has finished the feed step is now at high feed pressure (e.g., 100-500 psia), is depressurized to a medium pressure (e.g., 80-400 psia) in a direction the same (shown in FIG. 2) or opposite (not shown in FIG. 2) as the feed flow.

3. Co-Current (CoC) Depressurization 2 (DP2): The $CO_2$ VPSA bed, which is now at some medium pressure (e.g., 80-400 psia), is further depressurized to a lower pressure (e.g., 60-300 psia) in a direction the same (shown in FIG. 2) or opposite (not shown in FIG. 2) as the feed flow.

4. Co-Current (CoC) or Counter Current (CcC) Depressurization 3 (Fuel): The $CO_2$ VPSA bed, which is now at a pressure lower than at the start of step 3 (DP2) is further depressurized in a direction the same (shown in FIG. 2) or opposite (not shown in FIG. 2) to the feed flow direction to produce a hydrogen-depleted stream. This stream (stream 34 in FIG. 1) contains less hydrogen than the hydrogen in stream 24. The $H_2$-depleted stream is optionally and preferably mixed with fuel stream 40 generated by $H_2$ PSA unit 28 and is fed to SMR burners (unit 16). Alternatively, stream 34 can be sent to an incinerator or vented, depending on regulatory considerations and desired use. This step is carried out to a predetermined pressure level, P*. For a feed pressure of about 375 psia, P* is in the range of about 30-130 psia for the embodiments shown in FIGS. 2-5. As P* is reduced, $CO_2$ purity in the product increases and $CO_2$ recovery from the process decreases (and is used as stream 34). Accordingly, P* for the $CO_2$ VPSA process can be determined and designed based upon customer demand and requirements.

5. Blowdown (BD): The $CO_2$ VPSA bed, which is at the predetermined pressure level (P*), is now depressurized to close to ambient pressure (for example, about 20 psia) in a direction the same (not shown in FIG. 2) or opposite (shown in FIG. 2) to the feed flow to produce $CO_2$ product 36b shown in FIG. 3. This stream may constitute part of the $CO_2$ product (stream 36 in FIG. 3).

6. Evacuation (Evac.): The $CO_2$ VPSA bed, which is close to ambient pressure (e.g., about 20 psia), is evacuated using vacuum pump 44 to a predetermined low pressure (i.e., a subambient pressure, for example about 1-12 psia) in a direction the same as (not shown in FIG. 2) or opposite (shown in FIG. 2) to the feed flow. This stream (stream 36a in FIG. 3) constitutes part of the $CO_2$ product (stream 36 in the Figures). Optionally, stream 36a can be further compressed using a blower (not shown) prior to passing to tank 42.

7. Countercurrent (CcC) Pressure Equalization 2 (PE2): The evacuated bed is now pressure equalized to the pressure range of the gas produced in step 3 (DP2) (60-300 psia) in a direction the same as (not shown in FIG. 2) or opposite (shown in FIG. 2) to the feed flow. This step increases $CO_2$ recovery by keeping the $CO_2$ from step 3 within the VPSA system. This minimizes $CO_2$ loss by eliminating the need to send the $CO_2$ to a waste stream or to the fuel stream 34.

8. Countercurrent Pressure (CcC) Equalization 1 (PE1): The bed pressure equalized in step 7 is further pressure equalized to the pressure range of the gas produced in step 2 (DP1) (80-400 psia) in a direction the same as (not shown in FIG. 2) or opposite (shown in FIG. 2) to the feed flow. This step further increases $CO_2$ recovery by keeping the $CO_2$ from step 2 within the VPSA system. This minimizes $CO_2$ loss by eliminating the need to send the $CO_2$ to a waste stream or to the fuel stream 34.

9. Repressurization (RP): The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1. As further shown in FIG. 3, $CO_2$ product 36 is formed of $CO_2$ from streams 36a (step 6) and 36b (step 5) by product tank 42. Product 36 is expected to have a $CO_2$ purity level of approximately 90 mole percent or greater.

The nine-step process described is for one cycle for one bed in the $CO_2$ VPSA unit. The nine steps in this embodiment are carried out in a cyclic manner with the other beds in the $CO_2$ VPSA unit such that the feed-in and feed-effluent from step 1 are continuous. In addition, the evacuation step is continuous. This ensures that the vacuum pump operates continuously and that there is no interruption in feed into the $CO_2$ VPSA or to the $H_2$ PSA units.

In the embodiment described above, five adsorption beds are preferred to maintain the continuity of the key process steps. As described, this may be achieved by the process configuration as illustrated by the cycle chart in FIG. 2. A corresponding schematic flow diagram is shown in FIG. 3. The various valves in FIG. 3 can be operated in the manner illustrated in FIG. 4 to accomplish the nine steps in the five-bed process described hereinabove. For purposes of illustration and while not to be construed as limiting, typical step durations are listed in the left most columns of FIG. 4. Those skilled in the art will appreciate that such step durations are only exemplary and provided for purposes of illustration.

When the feed flow is large, the arrangement shown in FIGS. 2-4 can be modified to use two trains of five beds, thus doubling the throughput capacity of the $CO_2$ VPSA unit. An alternative to a two train, five-bed arrangement for such flows is shown in FIG. 5. The variation shown in FIG. 5 is also a nine-step process having two pressure equalizations as described above. In this embodiment, however, one train of eight beds (A1-A8) are used. In addition and as shown in FIG. 5, two beds are continuously in a feed step and at least two beds are continuously in an evacuation step. An alternative and preferred embodiment of the present invention is illustrated in FIGS. 6-8. This embodiment allows for higher $CO_2$ recovery. The arrangement shown in FIGS. 6-8 utilizes one train of six beds in the $CO_2$ VPSA unit. In this embodiment, there are eleven process steps and three pressure equalizations.

As shown in FIG. 6, steps DP3 and PE3 are additional steps relative to the embodiment shown in FIGS. 2-4. A process cycle for the embodiment shown in FIGS. 6-8 is as follows.

1. Feed Step: A feed stream 24 (shown in FIG. 1) containing at least carbon dioxide and hydrogen gases at a high pressure between about 100-500 psia (for example, about 375 psia) and produced by the shift reactor 20 is diverted to the $CO_2$ VPSA unit of the present invention. High-pressure effluent 32 (i.e., a $H_2$-enriched stream) from the $CO_2$ VPSA unit (unit 30 in FIG. 1) is sent to the $H_2$ PSA unit 28, which in turn produces high-pressure, high purity hydrogen product (stream 38 in FIG. 1). After a predetermined time or after $CO_2$ breakthrough from the bed on the feed 24, the feed step is terminated.

2. Co-Current (CoC) Depressurization 1 (DP1): The $CO_2$ VPSA bed, which has finished the feed step is now at high feed pressure (e.g., 100-500 psia), is depressurized to a medium pressure (e.g., 80-400 psia) in a direction the same (shown in FIG. 6) or opposite (not shown in FIG. 6) as the feed flow.

3. Co-Current (CoC) Depressurization 2 (DP2): The $CO_2$ VPSA bed, which is now at some medium pressure (e.g., 80-400 psia), is further depressurized to a lower pressure (e.g., 60-300 psia) in a direction the same as (shown in FIG. 6) or opposite (not shown in FIG. 6) as the feed flow.

4. Co-Current (CoC) Depressurization 3 (DP3): The $CO_2$ VPSA bed, which is now at some medium pressure (e.g., 60-300 psia), is further depressurized to a lower pressure (e.g., 50-200 psia) in a direction the same as (shown in FIG. 6) or opposite (not shown in FIG. 6) as the feed flow.

5. Co-Current (CoC) or Counter Current (CcC) Depressurization 4 (Fuel): The $CO_2$ VPSA bed, which is now at a pressure lower than at the start of step 4 (DP3) is further depressurized in a direction the same (shown in FIG. 6) or opposite (not shown in FIG. 6) to the feed flow direction to produce a hydrogen-depleted stream. This stream (stream 34 in FIG. 1) contains less hydrogen than the hydrogen in stream 24. The $H_2$-depleted stream is optionally and preferably mixed with fuel stream 40 generated by $H_2$ PSA unit 28 and is fed to SMR burners (unit 16). Alternatively, stream 34 can be sent to an incinerator or vented, depending on regulatory considerations and desired use. This step is carried out to a predetermined pressure level, P*. For a feed pressure of about 375 psia, P* is in the range of about 30-100 psia for the embodiment shown in FIGS. 6-8.

As P* is reduced, $CO_2$ purity in the product increases and $CO_2$ recovery from the process decreases (and is used as stream 34). Accordingly, P* for the $CO_2$ VPSA process can be determined and designed based upon customer demand and requirements.

6. Blowdown (BD): The $CO_2$ VPSA bed, which is at the predetermined pressure level (P*), is now depressurized to close to ambient pressure (for example, about 20 psia) in a direction the same (not shown in FIG. 6) or opposite (shown in FIG. 6) to the feed flow to produce $CO_2$ product 36b shown in FIG. 7. This stream may constitute part of the $CO_2$ product (stream 36 in FIG. 7).

7. Evacuation (Evac.): The $CO_2$ VPSA bed, which is close to ambient pressure (e.g., about 20 psia), is evacuated using vacuum pump 44 to a predetermined low pressure (i.e., a subambient pressure, for example about 1-12 psia) in a direction the same as (not shown in FIG. 6) or opposite (shown in FIG. 6) to the feed flow. This stream (stream 36a in FIG. 7) constitutes part of the $CO_2$ product (stream 36 in the Figures). Optionally, stream 36a can be further compressed using a blower (not shown) prior to passing to tank 42.

8. Countercurrent (CcC) Pressure Equalization 3 (PE3): The evacuated bed is now pressure equalized to the pressure range of the gas produced in step 4 (DP3) 50-200 psia) in a direction the same as (not shown in FIG. 6) or opposite (shown in FIG. 6) to the feed flow. This step increases $CO_2$ recovery by keeping the $CO_2$ from step 4 within the VPSA system. This minimizes $CO_2$ loss by eliminating the need to send the $CO_2$ to a waste stream or to the fuel stream 34.

9. Countercurrent (CcC) Pressure Equalization 2 (PE2): The bed pressure equalized in step 8 is now pressure equalized to the pressure range of the gas produced in step 3 (DP2) (60-300 psia) in a direction the same as (not shown in FIG. 6) or opposite (shown in FIG. 6) to the feed flow. This step increases $CO_2$ recovery by keeping the $CO_2$ from step 3 within the VPSA system. This minimizes $CO_2$ loss by eliminating the need to send the $CO_2$ to a waste stream or to the fuel stream 34.

10. Countercurrent Pressure (CcC) Equalization 1 (PE1): The bed pressure equalized in step 9 is further pressure equalized to the pressure range of the gas produced in step 2 (DP1) (8-0400 psia) in a direction the same as (not shown in FIG. 6) or opposite (shown in FIG. 6) to the feed flow. This step further increases $CO_2$ recovery by keeping the $CO_2$ from step 2 within the VPSA system. This minimizes $CO_2$ loss by eliminating the need to send the $CO_2$ to a waste stream or to the fuel stream 34.

11. Repressurization (RP): The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1. As further shown in FIG. 7, $CO_2$ product 36 is formed of $CO_2$ from streams 36b (step 6) and 36a (step 7) by product tank 42. Product 36 is expected to have a $CO_2$ purity level of approximately 90 mole percent or greater.

The eleven-step process described is for one cycle for one bed in the $CO_2$ VPSA unit. The eleven steps in this embodiment are carried out in a cyclic manner with the other beds in the $CO_2$ VPSA unit such that the feed-in and feed-effluent from step 1 are continuous. In addition, the evacuation step is continuous. This ensures that the vacuum pump operates continuously and that there is no interruption in feed into the $CO_2$ VPSA or to the $H_2$ PSA units.

In the embodiment described above in FIGS. 6-8, six adsorption beds are preferred to maintain the continuity of the key process steps. As described, this may be achieved by the process configuration as illustrated by the cycle chart in FIG. 6. A corresponding schematic flow diagram is shown in FIG. 7. The various valves in FIG. 7 can be operated in the manner illustrated in FIG. 8 to accomplish the eleven steps in the six-bed process described hereinabove. For purposes of illustration and while not to be construed as limiting, typical step durations are listed in the left most columns of FIG. 8. Those skilled in the art will appreciate that such step durations are only exemplary and provided for purposes of illustration.

EXAMPLE

The nine step process cycle of FIG. 2 described above was tested on a single-bed bench scale unit and is expected to readily scale up for a five-bed system. The inner diameter (ID) of the column was 0.68 inches and the packed bed height was 5 feet. The column was packed with about 0.5 lb of commercially available 1/16 inch NaY pellets. The feed contained 74 mole % helium (to simulate hydrogen for safety reasons), 16 mole % $CO_2$ and 10 mole % $CH_4$ (to simulate $CH_4+CO+N_2$). The feed was at about 374 psia.

The process was run in a cycle manner until it reached cyclic steady state. The bed was depressurized to about 20 psia. This was followed by evacuation to about 4 psia. The quantity and concentration of the depressurized and evacuated gas was measured. By choosing the pressure at the end of the fourth step (P*) to be about 40 psia, the total $CO_2$ produced from steps five and six was approximately 1 mmole/lb at about 93% $CO_2$ purity and about 75% recovery. By operating the same single bed unit in an eleven step process (including three pressure equalizations as shown in FIG. 6) as described above with reference to the six-bed arrangement, $CO_2$ recovery increased to about 77% (with about 93% purity). Such results are expected to readily scale up for a six-bed system. It is expected that the present invention can be modified to produce higher amounts of $CO_2$. For example, one may need or desire to process higher feed flow rates than may be handled by a single vacuum train or single vessel (due to fluidization or transportation limitations). In such situations, the nine process steps may be arranged such that more than one bed is on feed all the time and/or more than one bed is under evacuation all the time. As discussed hereinabove, an example of such an arrangement is shown in FIG. 5 for a process with two pressure equalizations.

The processes described herein may be operated at feed pressures higher than 100 psia, and more preferably greater than 300 psia (for example, about 375 psia). $CO_2$ in the feed gas is preferably higher than 10 mole percent, and most preferably greater than 15 mole percent (e.g., 15-25 mole percent). Feed temperature may be between about 40-200° F., more preferably between about 60-150° F., and most preferably about 100° F.

In alternative embodiments of the present invention, storage tanks may be added in place of some of the adsorbent beds in the process cycle to store some of the intermediate gas streams such as the depressurized gas. The purpose of these storage tanks is to maintain flow into and out of the $CO_2$ VPSA unit as continuous.

The present invention thus provides vacuum pressure swing adsorption (VPSA) processes and apparatus to recover carbon dioxide having a purity of approximately $\geq 90$ mole percent from streams containing at least carbon dioxide and hydrogen (e.g., syngas). In accordance with preferred embodiments of the present invention, there is constant feed, constant product being produced and rotating machinery is preferably run continuously so as to eliminate unnecessary tank(s). If, however, there are reasons for limiting the number of adsorbent beds (e.g., high cost of the adsorbent) storage tanks instead of the adsorbent vessels may be used as explained above. While every bed in a given process cycle goes through the same cycle, the number of beds is to be minimized taking these factors into consideration.

The feed to the $CO_2$ VPSA unit can be at super ambient pressure, and the $CO_2$ product can be produced in two streams as described above. When the $CO_2$ VPSA unit is installed upstream of a $H_2$ PSA unit, hydrogen recovery is expected to increase by extracting the $CO_2$, thereby increasing hydrogen partial pressure in the $H_2$ PSA feed stream. The recovered $CO_2$ can be used as produced or further upgraded such as shown in commonly owned U.S. Pat. application Ser. No. 11/395,137, filed on even date herewith and entitled "Carbon Dioxide Production Method" by Shah et al., the entire contents of which are incorporated herein by reference. The recovered $CO_2$ can then be used, sequestered or used in applications such as enhanced oil recovery (EOR).

It will be appreciated by those skilled in the art that the present invention is not limited to embodiments where the $CO_2$ VPSA unit is placed downstream of an SMR/shift reactor and upstream of a $H_2$ PSA unit. The present invention can also be used, for example, with a partial oxidation reactor together with any feed stream as defined hereinabove.

It will also be appreciated that in some cases, the pressure equalization steps could be eliminated. This may reduce hydrogen and/or carbon dioxide recovery since more hydrogen and/or carbon dioxide could be present in stream 34. In such cases, the number of beds may be reduced.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A vacuum pressure swing adsorption (VPSA) process for the recovery of carbon dioxide from a multi-component gas mixture containing at least carbon dioxide and hydrogen in a VPSA unit containing at least one adsorption bed containing at least one $CO_2$-selective adsorbent, the process comprising:

feeding the multi-component gas mixture containing the at least carbon dioxide and the hydrogen to the at least one adsorption bed at a first pressure within a first pressure range for a predetermined time to produce a hydrogen-enriched stream;

depressurizing the at least one adsorption bed in a first depressurization step from the first pressure range to a second pressure within a second pressure range in a same direction as or in a direction opposite to the feed flow;

depressurizing the at least one adsorption bed in a second depressurization step from the second pressure range to a third pressure within a third pressure range lower than the second pressure range and in a same direction as or in a direction opposite to the feed flow;

depressurizing the at least one adsorption bed in a third depressurization step from the third pressure range to a predetermined pressure range (P*) in a same direction as the feed flow or in a direction opposite the feed flow to produce a hydrogen-depleted stream;

depressurizing the at least one adsorption bed in a blow-down (BD) step from the P* pressure range to a pressure close to ambient pressure in a direction in a same direction or in a direction opposite as the feed flow to produce at least a first portion of $CO_2$ product;

evacuating the at least one adsorption bed from the pressure close to ambient to a pressure below ambient in a direction opposite or in a same direction as the feed flow to produce at least a second portion of $CO_2$ product;

pressure equalizing the at least one adsorption bed in a first pressure equalization step in a direction opposite or in a same direction as the feed flow;

further pressure equalizing the at least one adsorption bed in a second pressure equalization step in a direction opposite or in a same direction as the feed flow; and repressurizing the at least one adsorption bed in a repressurization (RP) step to the first pressure range;

wherein the process is repeated cyclically.

2. The process of claim 1, wherein the at least one adsorption bed comprises five beds.

3. The process of claim 1, wherein the first pressure range is between about 100-500 psia.

4. The process of claim 3, wherein the first pressure range is about 375 psia.

5. The process of claim 1, wherein the second pressure range is between about 80-400 psia.

6. The process of claim 1, wherein the third pressure range is between about 60-300 psia.

7. The process of claim 1, wherein P* is in the range of between about 30-130 psia.

8. The process of claim 1, wherein the first depressurization step is in a direction the same as the direction of the feed flow.

9. The process of claim 1, wherein the first depressurization step is in an opposite direction as the direction of the feed flow.

10. The process of claim 1, wherein the second depressurization step is in a direction the same as the direction of the feed flow.

11. The process of claim 1, wherein the second depressurization step is in an opposite direction as the direction of the feed flow.

12. The process of claim 1, wherein the third depressurization step is in a direction the same as the direction of the feed flow.

13. The process of claim 1, wherein the third depressurization step is in an opposite direction as the direction of the feed flow.

14. The process of claim 1, wherein the pressure range for the pressure close to ambient is about 20 psia.

15. The process of claim 1, wherein the pressure range for the pressure below ambient is 1-12 psia.

16. The process of claim 1, wherein the hydrogen-enriched stream is fed to a hydrogen recovery unit.

17. The process of claim 16, wherein the hydrogen recovery unit is a hydrogen pressure swing adsorption (PSA) unit.

18. The process of claim 1, wherein the first and second portion of the $CO_2$ product are combined to form a final $CO_2$ product.

19. The process of claim 1, wherein the at least one adsorption bed comprises eight beds.

20. The process of claim 19, wherein the first pressure range is between about 100-500 psia.

21. The process of claim 20, wherein the first pressure range is about 375 psia.

22. The process of claim 19, wherein the second pressure range is between about 80-400 psia.

23. The process of claim 19, wherein the third pressure range is between about 60-300 psia.

24. The process of claim 19, wherein P* is in the range of between about 30-130 psia.

25. The process of claim 24, wherein the first depressurization step is in a direction the same as the direction of the feed flow.

26. The process of claim 24, wherein the first depressurization step is in an opposite direction as the direction of the feed flow.

27. The process of claim 24, wherein the second depressurization step is in a direction the same as the direction of the feed flow.

28. The process of claim 24, wherein the second depressurization step is in an opposite direction as the direction of the feed flow.

29. The process of claim 24, wherein the third depressurization step is in a direction the same as the direction of the feed flow.

30. The process of claim 24, wherein the third depressurization step is in an opposite direction as the direction of the feed flow.

31. The process of claim 19, wherein the pressure range for the pressure close to ambient is about 20 psia.

32. The process of claim 19, wherein the pressure range for the pressure below ambient is 1-12 psia.

33. The process of claim 19, wherein the hydrogen-enriched stream is fed to a hydrogen recovery unit.

34. The process of claim 33, wherein the hydrogen recovery unit is a hydrogen pressure swing adsorption (PSA) unit.

35. The process of claim 19, wherein the first and second portion of the $CO_2$ product are combined to form a final $CO_2$ product.

36. A vacuum pressure swing adsorption (VPSA) process for the recovery of carbon dioxide from a multi-component gas mixture containing at least carbon dioxide and hydrogen in a VPSA unit containing at kast one adsorption bed containing at least one $CO_2$-selective adsorbent, the process comprising:

feeding the multi-component gas mixture containing the at least carbon dioxide and the hydrogen to the at least one adsorption bed to a first pressure within a first pressure range for a predetermined time to produce a hydrogen-enriched stream;

depressurizing the at least one adsorption bed in a first depressurization step from the first pressure range to a second pressure within a second pressure range in a same direction as or in a direction opposite to the feed flow;

depressurizing the at least one adsorption bed in a second depressurization step from the second pressure range to a third pressure within a third pressure range lower than the second pressure range and in a same direction as or in a direction opposite to the feed flow;

depressurizing the at least one adsorption bed in a third depressurization step from the third pressure range to a fourth pressure within a fourth pressure range lower than the third pressure range and in a same direction as or in a direction opposite to the feed flow;

depressurizing the at least one adsorption bed in a fourth depressurization step from the fourth pressure range to a predetermined pressure P* range in a same direction as the feed flow or in a direction opposite the feed flow to produce a hydrogen-depleted stream;

depressurizing the at least one adsorption bed in a blowdown (BD) step from the P* pressure range to a pressure close to ambient pressure in a same direction as or in a direction opposite to the feed flow to produce at least a first portion of $CO_2$ product;

evacuating the at least one adsorption bed from the pressure close to ambient to a pressure below ambient in a same direction as or in a direction opposite to the feed flow to produce at least a second portion of $CO_2$ product;

pressure equalizing the at least one adsorption bed in a first pressure equalization step in a same direction as or in a direction opposite to the feed flow;

further pressure equalizing the at least one adsorption bed in a second pressure equalization step in a same direction as or in a direction opposite to the feed flow;

further pressure equalizing the at least one adsorption bed in a third pressure equalization step in a same direction as or in a direction opposite to the feed flow; and repressurizing the at least one adsorption bed in a repressurization (RP) step to the first pressure range;

wherein the process is repeated cyclically.

37. The process of claim 36, wherein the at least one adsorption bed comprises six beds.

38. The process of claim 36, wherein the first pressure range is between about 100-500 psia.

39. The process of claim 38, wherein the first pressure range is about 375 psia.

40. The process of claim 36, wherein the second pressure range is between about 80-400 psia.

41. The process of claim 36, wherein the third pressure range is between about 60-300 psia.

42. The process of claim 36, wherein the fourth pressure range is between about 50-200 psia.

43. The process of claim 36, wherein P* is in the range of between about 30-100 psia.

44. The process of claim 36, wherein the first depressurization step is in a direction the same as the direction of the feed flow.

45. The process of claim 36, wherein the first depressurization step is in an opposite direction as the direction of the feed flow.

46. The process of claim 36, wherein the second depressurization step is in a direction the same as the direction of the feed flow.

47. The process of claim 36, wherein the second depressurization step is in an opposite direction as the direction of the feed flow.

48. The process of claim 36, wherein the third depressurization step is in a direction the same as the direction of the feed flow.

49. The process of claim 36, wherein the third depressurization step is in an opposite direction as the direction of the feed flow.

50. The process of claim 36, wherein the fourth depressurization step is in a direction the same as the direction of the feed flow.

51. The process of claim 36, wherein the fourth depressurization step is in an opposite direction as the direction of the feed flow.

52. The process of claim 36, wherein the pressure range for the pressure close to ambient is about 20 psia.

53. The process of claim 36, wherein the pressure range for the pressure at or below ambient is 1-12 psia.

54. The process of claim 36, wherein the hydrogen-enriched stream is fed to a hydrogen recovery unit.

55. The process of claim 54, wherein the hydrogen recovery unit is a hydrogen pressure swing adsorption (PSA) unit.

56. The process of claim 36, wherein the first and second portion of the $CO_2$ product are combined to form a final $CO_2$ product.

* * * * *